US011988028B2

(12) United States Patent
Liermann

(10) Patent No.: US 11,988,028 B2
(45) Date of Patent: May 21, 2024

(54) DOOR HINGE

(71) Applicant: Nicolas Liermann, Rheda-Wiedenbrueck (DE)

(72) Inventor: Nicolas Liermann, Rheda-Wiedenbrueck (DE)

(73) Assignee: SIMONSWERK GMBH, Rheda-Wiedenbrueck (DE)

( * ) Notice: Subject to any disclaimer, the term of this patent is extended or adjusted under 35 U.S.C. 154(b) by 56 days.

(21) Appl. No.: 17/971,147

(22) Filed: Oct. 21, 2022

(65) Prior Publication Data

US 2023/0151659 A1 May 18, 2023

(30) Foreign Application Priority Data

Nov. 16, 2021 (DE) ............................ 102021129920

(51) Int. Cl.
*E05D 5/02* (2006.01)
*E05D 3/06* (2006.01)
*E05D 7/00* (2006.01)

(52) U.S. Cl.
CPC ............. *E05D 7/0045* (2013.01); *E05D 3/06* (2013.01); *E05Y 2600/41* (2013.01); *E05Y 2900/132* (2013.01)

(58) Field of Classification Search
CPC .... E05D 3/06; E05D 3/12; E05D 3/14; E05D 3/142; E05D 3/16; E05D 3/125; E05D 3/127; E05D 3/185; E05D 3/186; E05D 7/04; E05D 7/0423; E05D 7/0415; E05D 7/043; E05D 7/0027; E05D 7/0045; E05D 5/02; E05D 5/0215; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05D 9/00; E05Y 2600/41; E05Y 2600/634;
(Continued)

(56) References Cited

U.S. PATENT DOCUMENTS 375,039 A * 12/1887 Wright .................. E05D 7/0423 16/388
880,317 A * 2/1908 Von De Marwitz ......................... E05D 7/0423 16/388
(Continued)

FOREIGN PATENT DOCUMENTS

DE 29806594 U 9/1998
DE 202006001574 U 7/2007
(Continued)

OTHER PUBLICATIONS

Simonswerk Tectus Manual 2021.

*Primary Examiner* — Chuck Y Mah
(74) *Attorney, Agent, or Firm* — Andrew Wilford

(57) ABSTRACT

A door hinge has a first leaf assembly, a second leaf assembly, and a link assembly connected to the leaf assemblies for pivoting of the second assembly on the first assembly. An adjuster in the first leaf assembly can displace the link assembly relative to the first leaf assembly and thereby adjust a position of the door in the frame. The adjuster has an adjusting element projecting from the first leaf assembly in the closed position. The second leaf assembly is formed with a recess in which the projecting adjuster engages in the closed position.

8 Claims, 2 Drawing Sheets

(58) Field of Classification Search
CPC ........... E05Y 2600/412; E05Y 2600/45; E05Y 2600/452; E05Y 2600/46; E05Y 2600/51; E05Y 2900/132; E05Y 2900/20; E05Y 2900/50; E05Y 2900/531; E05Y 2900/546; E05Y 2201/624; E05Y 2201/638; E05Y 2800/45; E05Y 2800/674
See application file for complete search history.

(56) References Cited

U.S. PATENT DOCUMENTS

| | | | | | |
|---|---|---|---|---|---|
| 1,257,572 | A * | 2/1918 | Appleby | E05D 7/105 | 16/388 |
| 1,391,304 | A * | 9/1921 | Dowling | E05D 15/48 | 16/388 |
| 1,612,656 | A * | 12/1926 | Salin | E05D 3/02 | 16/388 |
| 1,923,721 | A * | 8/1933 | Glenn | E05D 11/0027 | 16/388 |
| 2,571,633 | A * | 10/1951 | Vogel | E05D 11/0027 | 16/388 |
| 4,085,650 | A * | 4/1978 | Flynn | E05D 11/0027 | 16/388 |
| 4,131,969 | A * | 1/1979 | Suska | E05D 11/0027 | 16/388 |
| 4,133,114 | A * | 1/1979 | Roach | E05D 11/0009 | 16/388 |
| 4,780,929 | A * | 11/1988 | Burns | A63C 5/02 | 16/349 |
| 5,755,011 | A * | 5/1998 | Green | E05D 7/0423 | 16/241 |
| 6,202,255 | B1 * | 3/2001 | Sitter | E05D 11/0027 | 16/242 |
| 9,976,327 | B2 | 4/2018 | Dreisewerd | | |
| 2017/0089108 | A1 * | 3/2017 | Nikolaus | E05D 3/186 | |
| 2017/0130497 | A1 * | 5/2017 | Yamaguchi | E05D 3/16 | |
| 2019/0071904 | A1 * | 3/2019 | Migliorini | E05D 7/0415 | |

FOREIGN PATENT DOCUMENTS

| | | | | |
|---|---|---|---|---|
| DE | 102020108107 | B | 10/2020 | |
| EP | 810341 | A1 * | 12/1997 | E05D 11/0027 |
| GB | 2127892 | A * | 4/1984 | E05D 11/0027 |

* cited by examiner

DOOR HINGE

FIELD OF THE INVENTION

The present invention relates to door hinge. More particularly this invention concerns a recessed door hinge.

BACKGROUND OF THE INVENTION

A known recessed door hinge has a first leaf assembly and a second leaf assembly that are pivotal on each other and lie opposite one another in a closed-door position, with an adjuster with at least one actuating element associated with the first leaf assembly.

Adjustable door hinges are known in different embodiments. The invention refers to door hinges that are concealed between door frame and door panel in the closed position of the door, to which end the assemblies are recessed set in respective mortises in the edge of a door panel as well as of a reveal of the door frame. Corresponding door hinges are sold by the Simonswerk GmbH under the brand name TECTUS®. Corresponding products are described in the "Manual 2018/2019," Simonswerk GmbH, pages 45ff.

Reference is also made to U.S. Pat. No. 9,976,327 whose disclosure is herewith incorporated by reference.

Door hinges for concealed installation have adjusters with which the door panel in three mutually perpendicular directions when in the closed position. The adjustment takes place by relative movement against each other of fixed adjustable components of at least one of the leaf assemblies of the door hinge. Related to the usual arrangement of a door hinge on a door frame there is a height adjustment in a vertical direction, a pressure adjustment in a horizontal thickness direction of the door panel perpendicular to the plane of the door panel, and another horizontal adjustment extending parallel to the plane of the door panel.

The door hinges described are available for different weight classes and are characterized by good stability and durability. Outside the usual everyday loads of a door hinge there is often the requirement to resist willful manipulation, for instance from a break-in attempt. The known hinges are susceptible to a prying out of the hinge edge of the door, which is only resisted by the link assemblies extending between the inner and outer leaf assemblies.

For improved resistance at the hinge side of a door, separate door safety devices or also safety pins are known, as described for example in the above-mentioned "Manual 2018/2019" of Simonswerk GmbH on pages 195 to 198 and 464.

A door hinge in the form of a simple hinge with a securing pin is known from DE 298 06 594, where the securing pin is mounted on one leaf assembly and engages in a bore of an opposite leaf assembly in a closed position.

A door hinge with an integrated safety device is also known from DE 20 2006 001 574. The door hinge is provided with an adjustment function and has guide elements screwed firmly to a door panel, which also have the function of a security pin and cooperate with associated openings in a closed position. An actuating element for adjusting the door hinge is concealed.

Although the invention is described in the context of a concealed hinge, it not limited to this kind of hinge. In principle within the scope of the invention also other designs of door hinges can be provided.

OBJECTS OF THE INVENTION

It is therefore an object of the present invention to provide an improved door hinge.

Another object is the provision of such an improved door hinge that overcomes the above-given disadvantages, in particular that is of compact construction.

Yet another object is to provide a door frame, a door panel and a door hinge according to the invention.

SUMMARY OF THE INVENTION

A door hinge according to the invention has a first leaf assembly, a second leaf assembly, and a link assembly connected to the leaf assemblies for pivoting of the second assembly on the first assembly. One of the leaf assemblies is adapted to be secured to an edge of a door panel and the other of the leaf assemblies is adapted to be secured to a door frame for pivotally mounting the panel in the frame for movement between closed and open positions. An adjuster in the first leaf assembly can displace the link assembly relative to the first leaf assembly and thereby adjust a position of the door in the frame. The adjuster has an adjusting element projecting from the first leaf assembly in the closed position. The second leaf assembly is formed with a recess in which the projecting adjuster engages in the closed position.

According to the invention, the adjusting element has a secondary function in that it serves not only for the actuation of the adjuster, but also provides for an additional level of security to the door hinge. This double functionality is achieved in a particularly compact construction. The standard mortise already provided for the first leaf assembly can be used for additional securing purposes, whereas the second leaf assembly need only be formed with the inventive recess, which clearly takes up no space.

While with conventional door safety devices pins and corresponding recesses are installed separately so are often left out or misaligned. The inventive system is considerably simpler and the danger of a misalignment is excluded.

The additional security feature in the door hinge in accordance with the invention can easily be added to an existing hinge by changing the adjusting element and forming the recess.

The invention also takes into account that a corresponding protection function is desired in the practice only in certain applications. It is then also particularly easily possible to stock the door hinge with the features according to the invention or without the features according to the invention since all that is needed is a different adjusting element.

Even if no safety function is desired so that the adjusting element does not extend from the first leaf assembly, the unused recess can be present at the second leaf assembly. If a corresponding security functionality is not desired, there can also be cover plates on the assemblies, as these for example also known from DE 10 2020 108 107.

According to a preferred further development of the invention the adjusting element has a tool seat or socket and/or is rotatable. The adjusting element can be for example a screw, a spindle or an eccentric.

The recess can be in the framework of the invention without limitation merely a cavity with a floor or also a through-going hole in the outer housing part of the second leaf assembly.

In order to achieve a good securing effect, a suitable engagement depth of the adjusting element in the recess is needed, taking into account various factors such as the size of the door hinge, the width of the frame/door gap in the closed position and the stability of the door hinge and the like. According to a preferred embodiment of the invention the depth of engagement is between 4 mm and 20 mm. With too small an engagement depth there is the danger that a massive force and deformation of the door panel and/or of the door frame the overcomes the desired safety function. With to deep an engagement on the other hand the kinematics of the door hinge can be impaired. In addition, the door must be able to swing into closing position without the adjusting element engaging the walls of the recess. Thus in the closed position usually no abutment of the adjusting element against a side wall of the recess is desired. On the other hand then a positive support between the actuation element and the recess should be present in the case of some outside force being applied, typically occurring without permanent damage of the door hinge.

Against this background according to a preferred embodiment of the invention, in the closed position the adjusting element is arranged with a smallest lateral distance between 0.1 mm and 5 mm to the side wall of the recess. The smaller lateral distance is usually provided in the direction, in which also the door panel opens.

Furthermore the adjusting element is preferably also eccentric or off-center in the recess, with in the opening direction opposite the stop direction a larger lateral spacing is provided in order to enable in particular also the adjusting element to pivot in and pivot out of the recess.

Preferably two or more adjusting elements are provided on the first leaf assembly, and door hinges often have with respect to a horizontal center plane a symmetrical or approximately symmetrical structure. Thus two adjusting elements symmetrically flanking this symmetry plane provide a still better safety function and force distribution.

In the framework of the invention further embodiments of the door hinge are not excluded. In principle for example the two assemblies can be designed in the manner of hinge flaps and a hinge roller connecting them to each other.

According to a particularly preferred embodiment of the invention however, the assemblies are intended for the concealed mortising into the edge of a door panel as well as a reveal side of a door frame.

Furthermore, the assemblies are connected to each other by a link assembly comprising at least two links pivoted together centrally between the leaf assemblies and having ends seated in the link assemblies. Such hinges are described in the above-cited patent references.

Of course door panels are usually connected with at least two door hinges, however if necessary also only one of the door hinges is theoretically possible according to the invention. Two door hinges are however the preferred arrangement, and a very heavy door might have three or more. The door hinges support the door panel for pivotal movement and the adjuster is used to center the panel in the door frame so that in the closed position the adjusting element together with the recess forms a hinge-side door safety device.

In the context of the invention, without an additional assembly effort and in a particularly simple manner an additional safety function is provided.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
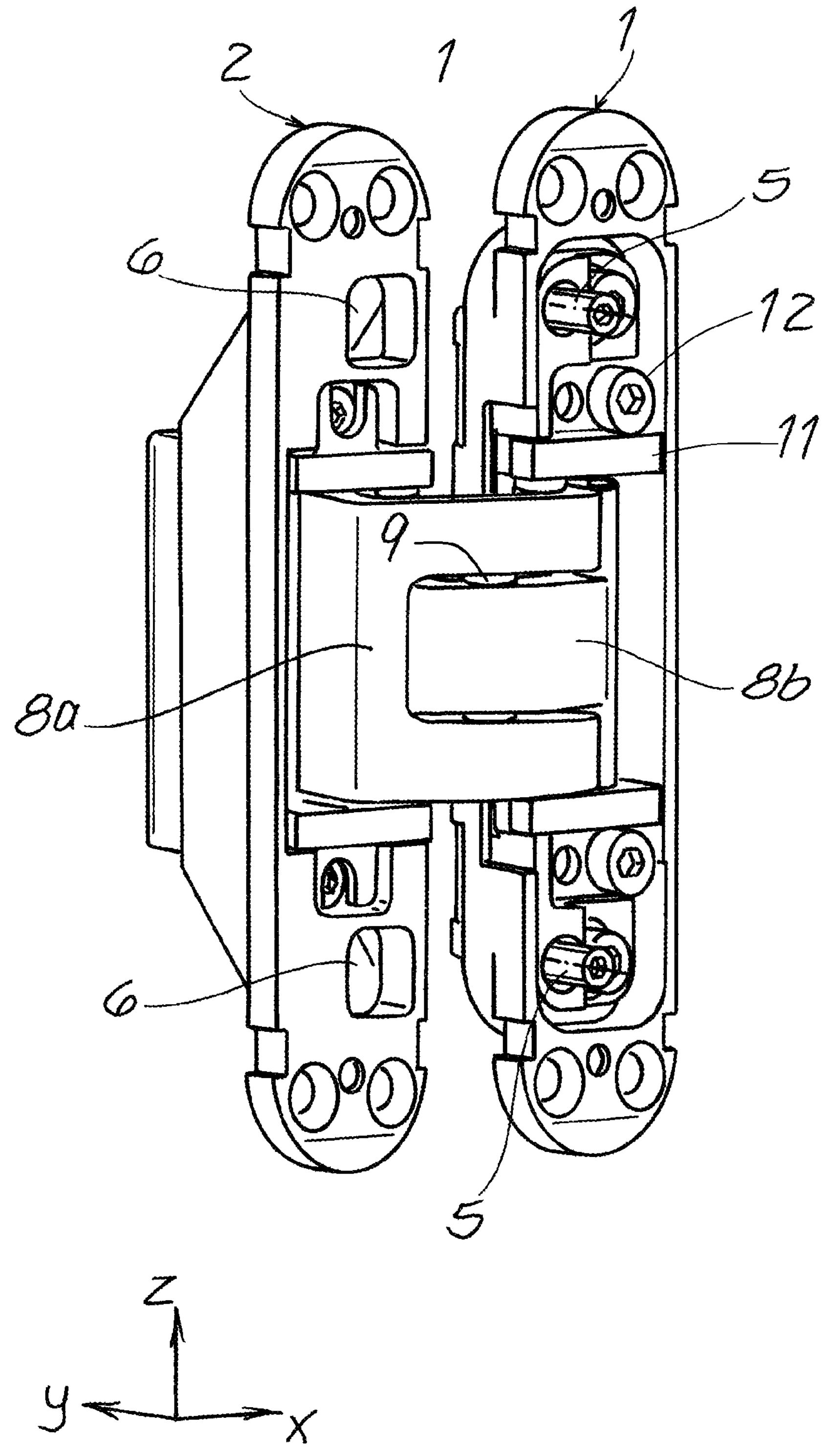
FIG. 1 is an isometric view of the inventive hinge in the open position.

FIG. 1 shows a door hinge according to the invention with a first leaf assembly 1 and a second leaf assembly 2 that are hinged to each other by a pair of links 8*a* and 8*b* pivoted on each other by a vertical pivot pin 9. The assemblies 1 and 2 are both of multipart design, each comprising an outer part 13 and an inner part 11, and built to allow adjustment of the position of a door panel 4 carried on the assembly 2 relative to a frame 3. A pair of vertically spaced adjusters each with an adjusting element 5 are provided on the first leaf assembly 1 to move the respective an inner housing part 11 in turn carrying the link assembly 8*a*, 8*b*, 9 relative to the respective outer housing part 13. Further adjusters are provided in the illustrated door hinge to move the link assembly 8*a*, 8*b*, 9 relative to the inner housing part 11 but here are of subordinate importance.

As seen in FIG. 1 each adjusting element 5 projects from the first leaf assembly 1. The second leaf assembly 2 is formed in the outer housing part 13 level in height with each of the adjusting elements 5 with a recess 6 formed as a throughgoing hole.

Figure 3:
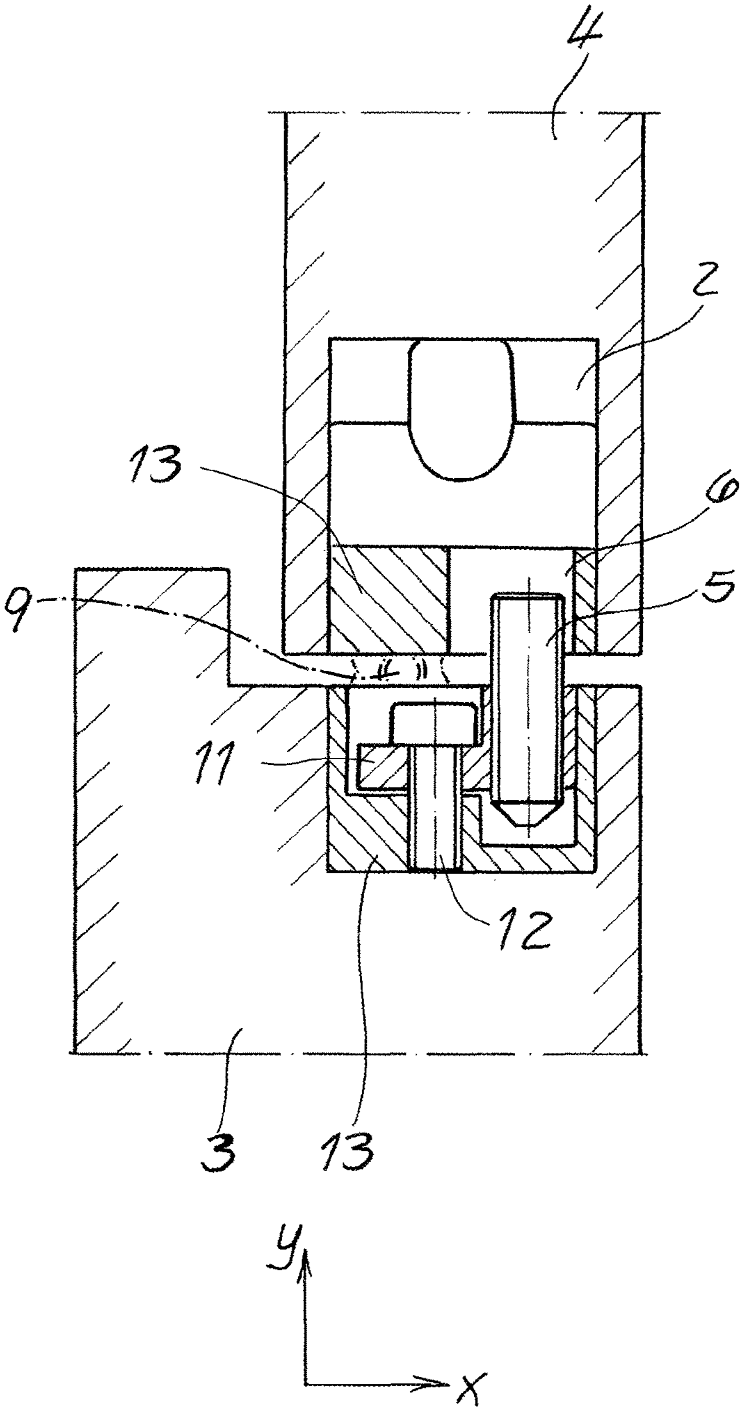
FIG. 3 is a large-scale cross-sectional view of FIG. 2.

In FIG. 1 the door hinge is in an open position and in FIG. 3 in the closed position. In the open position both assemblies 1 and 2 face in the same direction and lie on a common plane p defined by their outer faces. In the closed position the planes P of the assemblies 1 and 2 are closely spaced parallel to each other or even coplanar and the assemblies 1 and 2 confronting one another. Here the outer housing part 13 of the assembly 1 is mortised into the door frame 3 so it is fixed therein, and the outer part 13 of the assembly 2 is mortised into the door edge and pivots with the door 4 between the open and closed positions generally about the axis of the pin 9 (vertical direction z).

As described above each adjusting element 5 projects perpendicular to the plane P from the first leaf assembly 1 in the closed position into the recess 6 of the second leaf assembly 2, thereby providing a further degree of security, namely to deter prying open the door 4 on the hinge edge. Thus even though the inventive door hinge has a compact structure, it has a double function. On the one hand the adjusting element 5 allows adjustment of the position of the door 4 in the frame 3 and on the other hand an improved safety function is achieved, needing no more space than a conventional such door hinge.

FIG. 1 also shows that the door hinge is symmetrical with respect to a horizontal central symmetry plane perpendicular to the plane P extending in directions x and y, with the two adjusting elements 5 vertically symmetrically flanking this symmetry plane 2.

Figure 2:
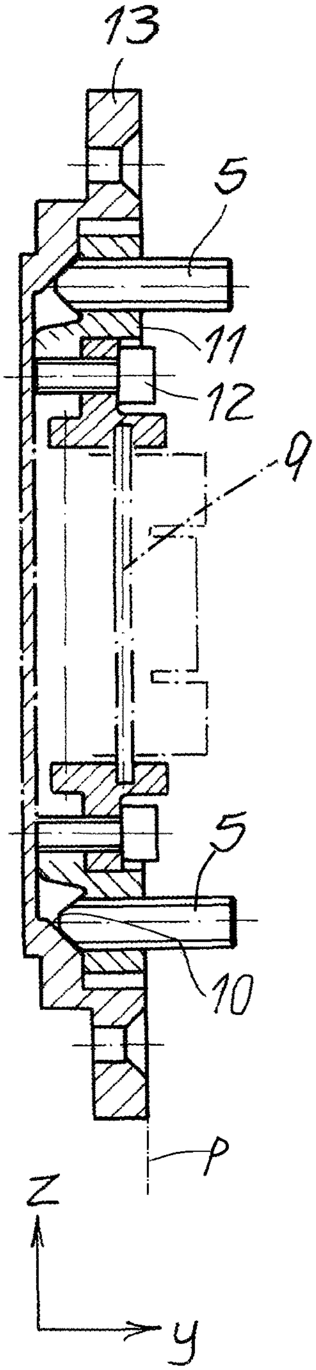
FIG. 2 is a vertical section through one of the leaf assemblies of the hinge.

FIG. 2 is a longitudinal section through the first leaf assembly 1 in the area of the adjusting element 5. Here, each adjusting element 5 is a hex-socket gub screw that has a frustoconical tip bearing on a similarly angled face 10 of the outer housing part 13. Screwing in or out these screws 5 can shift the inner housing part 11 relative to the outer housing part 13 and thereby change the door position in the horizontal direction 7 parallel to a plane of the door 4 that itself extends parallel to the directions y and z. More particularly screwing both of the screws 5 in will move the link assembly 8*a*, 8*b*, 9 out, screwing them in will move it inward, and screwing one of them in and the other out will shift the link assembly 8*a*, 8*b*, 9 vertically relative to the inner housing part 11 since the two faces 10 extend at about 90° to each other. Movement of the inner housing part 11 away from the outer housing part 13 to the right as shown in FIG. 2 is limited by headed screws 12 whose shafts pass with clearance through the inner part 11, whose heads bear inward on the inner part 11, and that are threaded into the inner part 11.

The screwing in and unscrewing of the adjusting element changes to a certain extent also the depth of engagement of the adjusting elements 5 in the associated recesses 6. The projection of the adjusting elements 5 with respect to the first leaf assembly 1 is however so selected, that the length variation at the height setting is negligible. In the closed position, the depth of engagement of the adjusting element 5 in the recess 6 is typically between 4 mm and 20 mm. Although here the adjusting element 5 is a screw, alternatively it would be possible to use an adjusting spindle or eccentric mechanism for the same effect.

It is further noted that the adjusting elements 5 engage in the recesses 6 offcenter, that is not in the center, as shown in FIG. 3. Thereby is noted that the adjusting element is eccentric in the recess 6 but is always spaced from inner side walls of the respective recess to allow the door 4 to swing.

I claim:

1. A door hinge comprising:

a first leaf assembly;

a second leaf assembly;

a link assembly connected to the leaf assemblies for pivoting of the second assembly on the first assembly, one of the leaf assemblies being adapted to be secured to an edge of a door panel and the other of the leaf assemblies being adapted to be secured to a door frame for pivotally mounting the panel in the frame for movement between closed and open positions; and an adjuster in the first leaf assembly for displacing the link assembly relative to the first leaf assembly and thereby adjusting a position of the door in the frame, the adjuster having an adjusting element projecting from the first leaf assembly in the closed position, the second leaf assembly being formed with a recess in which the projecting adjuster engages in the closed position.

2. The door hinge according to claim 1, wherein the adjustment element has a tool seat or socket and is rotatable.

3. The door hinge according to claim 1, wherein in the closed position an engagement depth of the adjusting element in the recess is between 4 mm and 20 mm.

4. The door hinge according to claim 1, wherein the adjusting element is from the group of adjusting screw, adjusting spindle and adjusting eccentric.

5. The door hinge according to claim 1, wherein in the closed position the adjusting element is at a lateral spacing between 0.1 mm and 5 mm from a side wall of the recess.

6. The door hinge according to claim 1, wherein the adjusting element is off center in the recess in the closed position.

7. The door hinge according to claim 1, wherein the link assembly further comprises:

two links pivoted to each other and to the leaf assemblies.

8. In combination with the door hinge according to claim 1, a door having an edge in which one of the leaf assemblies is mortised; and a door frame surrounding the door and in which the other of the leaf assemblies is mortised.

* * * * *